United States Patent
Min

[11] Patent Number: 5,936,917
[45] Date of Patent: Aug. 10, 1999

[54] METHOD FOR DETERMINING A DIFFERENCE BETWEEN A SUB-Q CODE AND A HEADER OF A CD-ROM

[75] Inventor: Kyoung-seo Min, Suwon, Rep. of Korea

[73] Assignee: Samsung Electronics Co., Ltd., Kyungki-do, Rep. of Korea

[21] Appl. No.: 08/819,031

[22] Filed: Mar. 17, 1997

[30] Foreign Application Priority Data

May 14, 1996 [KR] Rep. of Korea ........................ 96 15979

[51] Int. Cl.⁶ ......................................................... G11B 7/00
[52] U.S. Cl. ................................. 369/32; 369/56; 369/84; 369/83
[58] Field of Search ......................... 369/32, 44.4, 44.28, 369/44.26, 124, 56, 83, 84

[56] References Cited

U.S. PATENT DOCUMENTS 4,949,323  8/1990  Yoshida .
5,175,716  12/1992  Min ...................................... 369/44.11
5,574,704  11/1996  Shimosaka ................................ 369/32

FOREIGN PATENT DOCUMENTS 4-010228  1/1992  Japan .
7-006522  1/1995  Japan .

*Primary Examiner*—Tod R. Swann
*Assistant Examiner*—Kim-Kwok Chu
*Attorney, Agent, or Firm*—Sughrue, Mion, Zinn, Macpeak & Seas, PLLC

[57] ABSTRACT

A method for determining the difference between the sub-Q code and header of a CD-ROM loaded in a CD-ROM drive is provided. The method includes the providing a read-out command to a controller in the CD-ROM drive, searching for a sub-Q code area of a first frame and reading the sub-Q code of the sub-Q code area according to the read-out command and storing the same, by means of the controller, enabling a decoder in the CD-ROM drive and reading header information which is the primary output from the decoder, by means of the controller, calculating the difference between the stored sub-Q code and the stored header information, by means of the controller, and processing the difference and transmitting the result, by means of the controller. Here, the result is processed in a computer and displayed on a monitor connected to the computer. Accordingly, it is possible to determine the influence of the recording structure of the CD-ROM on access time, thereby allowing steps to be taken to improve the quality and reliability of the CD-ROM.

14 Claims, 3 Drawing Sheets

METHOD FOR DETERMINING A DIFFERENCE BETWEEN A SUB-Q CODE AND A HEADER OF A CD-ROM

BACKGROUND OF THE INVENTION

1. Field of the Invention

The present invention relates to a method for determining the difference between a sub-Q code and a header of a CD-ROM.

The instant application is based on Korean Patent Application No. 96-15979, which is incorporated herein by reference for all purposes.

2. Description of the Related Art

FIG. 1 shows the structure of a frame of a general CD-ROM. As shown in FIG. 1, the frame of the general CD-ROM includes, sequentially, a synchronizing signal area 101 for containing a synchronizing signal which signals the beginning of the frame, a sub-Q code area 102 for containing a sub-Q code which signals the standard position information of a frame, a header area 103 for recording position information of the respective frames, a user data area 104, and a parity area 105 for containing a parity signal used to confirm whether the user data has been correctly reproduced.

FIG. 2 is a flow diagram for describing the manufacturing process of the general CD-ROM. As shown in FIG. 2, the manufacturing process of the general CD-ROM includes step 201 for controlling the user data so as to fit into the file system structure of the CD-ROM, step 202 for performing an entire control according to the Yellow book, step 203 for performing additional control according to the Red book, and step 204 for forming a master stamper. Here, the Yellow book and the Red book, respectively represent the standard CD-ROM and the CD-DA (compact disk-digital audio) specifications. The Red book is applied since the specification of the sub-Q code is set forth therein. The Yellow and Red books are incorporated by reference herein for all purposes. Therefore, the user data 104 and parity 105, the header 103, and the sub-Q code 102 of FIG. 1 are respectively controlled in steps 201, 202, and 203. Meanwhile, the CD-ROM can be mass-produced by the master stamper formed in step 204, in which the recording structure of the master stamper is the very reverse of that of the corresponding CD-ROM.

As described above regarding FIGS. 1 and 2, the sub-Q code and header information are recorded in the respective frames of the general CD-ROM. Accordingly, most CD-ROM drives search for the specified sub-Q code area to then search for a predetermined frame during a reproducing process, and then search for a specific frame by reading the subsequent header. Here, the sub-Q code and header act as a lapse from the end of the TOC (table of contents) of the CD-ROM to the position of interest on the CD-ROM. Therefore, the larger the difference between the sub-Q and header, that is, the larger the difference between the standard position information and the recording position information of a frame, the longer the access time becomes. Nevertheless, a method for determining the difference between the sub-Q code and the header has not been developed. In particular, in the process of manufacturing a CD-ROM it is very important to determine the difference between the sub-Q code and header with respect to the formed master stamper. The Yellow book standardizes this difference to be within 1 second.

SUMMARY OF THE INVENTION

It is an object of the present invention to provide a method for determining the difference between a sub-Q code and header of a CD-ROM loaded in a drive of a computer.

To achieve the above object, there is provided a method for determining a difference between a sub-Q code and a header of a CD-ROM loaded in a CD-ROM drive having a controller and a decoder, the method comprising: providing a read-out command to the controller in the CD-ROM drive; searching for a sub-Q code area of a first frame of the CD-ROM and reading a sub-Q code recorded in the sub-Q code area according to said read-out command and storing the sub-Q code; enabling the decoder in the CD-ROM drive and reading header information of the CD-ROM which is output from said decoder; calculating a difference between the sub-Q code and the header based on the stored sub-Q code and read header information; and processing the difference to produce a result and outputting the result.

In this case, the searching for a sub-Q code area comprises: controlling said digital signal processor and servo signal processor by the controller; controlling said servo driver by said digital signal processor and servo signal processor; driving and moving said pickup to the sub-Q code area of the first frame by said servo driver; forming the EFM signal from the current signal output from said pickup by said RF amplifier; processing said EFM signal and transmitting the sub-Q code to said controller by said digital signal processor; and storing the transmitted sub-Q code by said controller.

Further, there is provided an apparatus for determining a difference between a sub-Q code and header of a CD-ROM loaded in a CD-ROM drive having a controller, comprising: a pickup for detecting information recorded on the CD-ROM and outputting a current signal; an RF amplifier connected to said pickup for forming an EFM (eight to fourteen modulation) signal from the current signal output from said pickup and outputting an EFM signal; a servo signal processor connected to said RF amplifier for performing servo control by processing said current signal and said EFM signal according to a control command of said controller; a digital signal processor connected to said RF amplifier for processing the EFM signal and detecting a data signal therefrom; and a servo driver connected to said servo signal processor, said digital signal processor and said pickup for driving said pickup according to the servo control performed by said servo signal processor and said digital signal processor.

BRIEF DESCRIPTION OF THE DRAWINGS

The above objects and advantages of the present invention will become more apparent by describing in detail a preferred embodiment thereof with reference to the attached drawings in which.

DETAILED DESCRIPTION OF THE INVENTION

A preferred embodiment of a method for determining the difference between a sub-Q code and a header of a CD-ROM according to the present invention is described below in detail with reference to the accompanying drawings.

Figure 3:
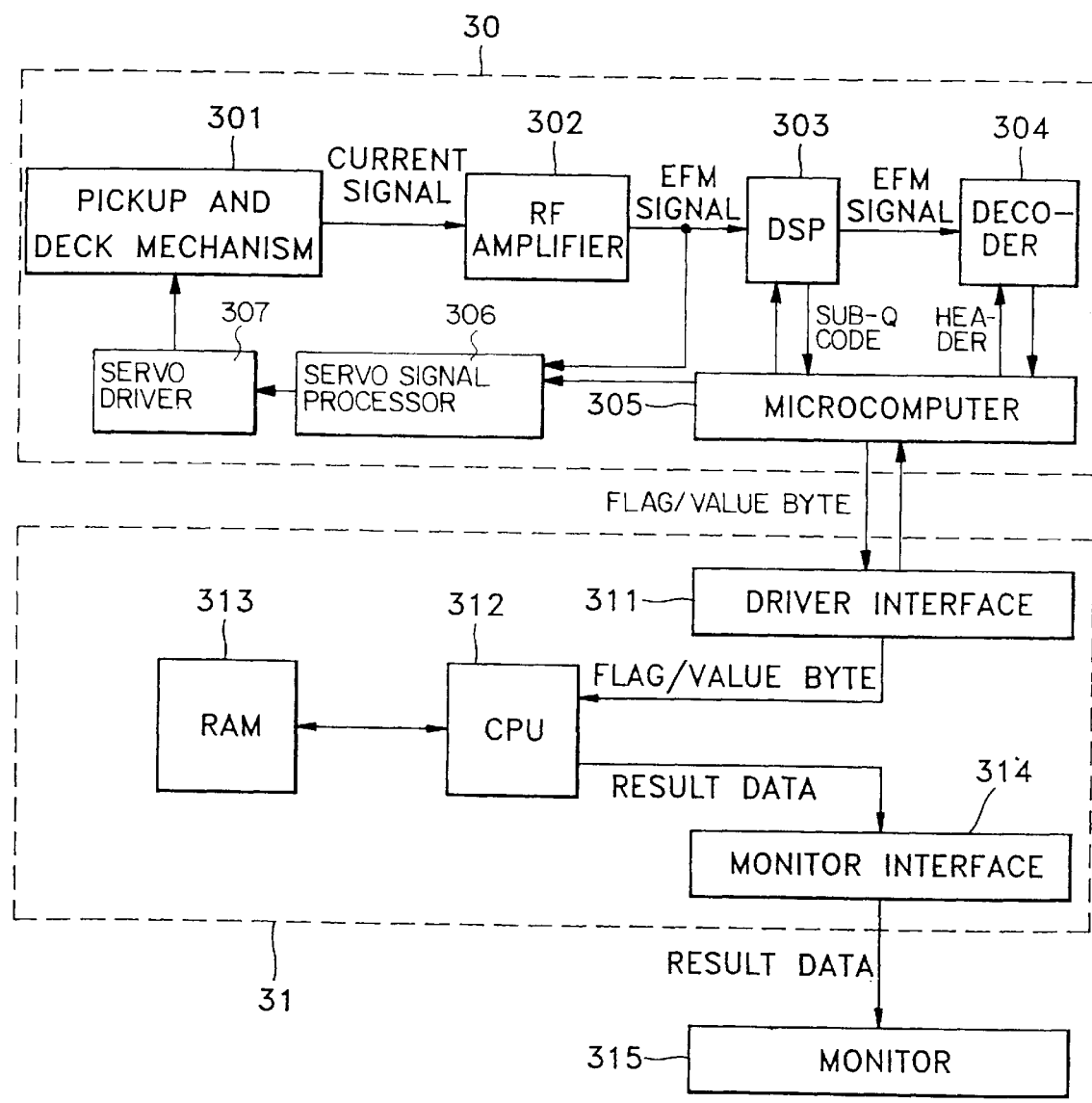
FIG. 3 is a signal flow diagram of an apparatus which determines the difference between a sub-Q code and header of the CD-ROM according to an embodiment of the present invention.
Figure 4:
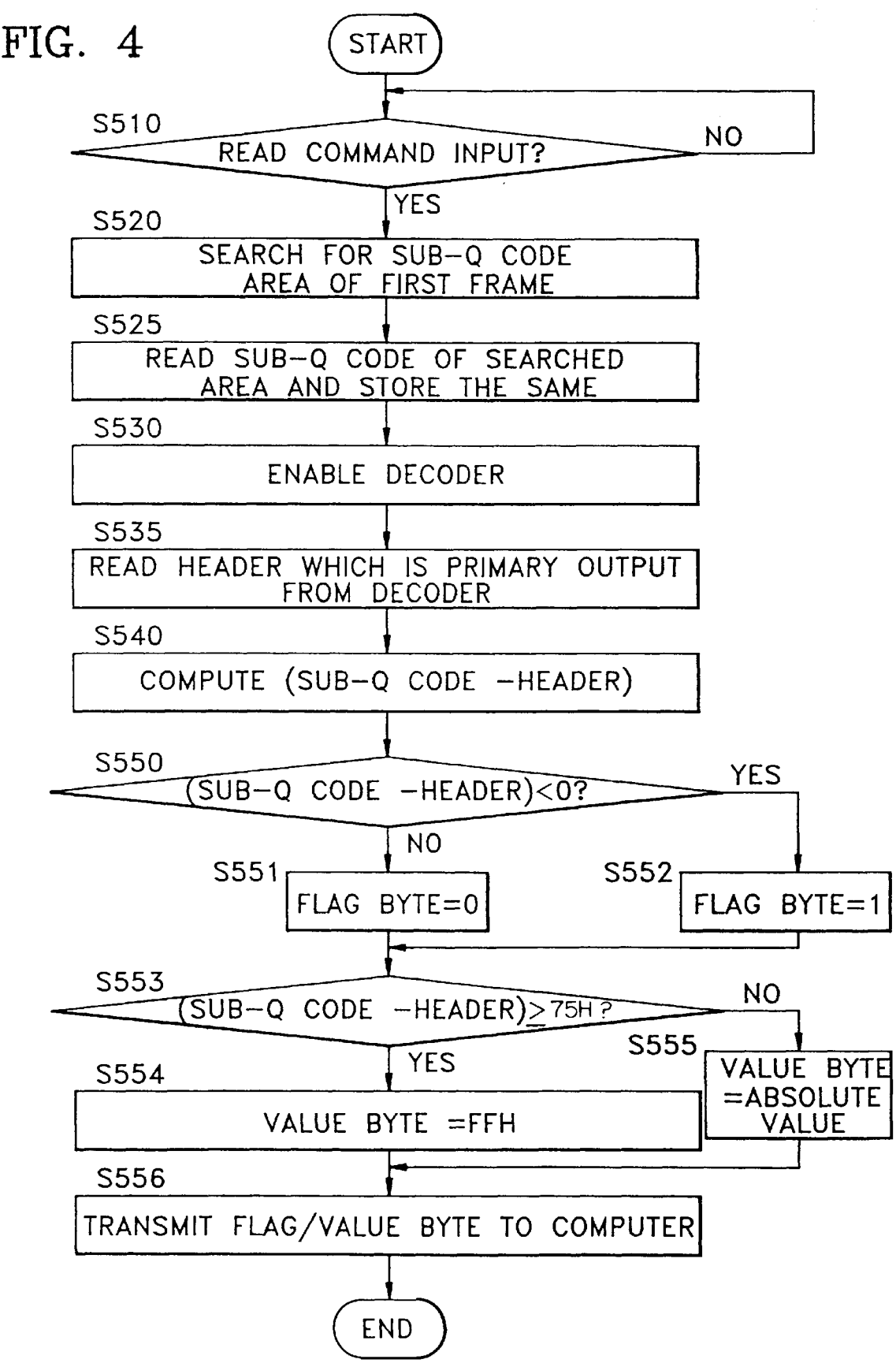
FIG. 4 is a flow chart showing the process performed by the microcomputer shown in FIG. 3.

FIG. 3 is a signal flow diagram which illustrates a method for determining the difference between the sub-Q code and header of the CD-ROM according to an embodiment of the present invention, and FIG. 4 is a flow chart showing the process performed by the microcomputer of FIG. 3. The operational relationship in FIGS. 3 and 4 is as follows.

First, in a state in which a CD-ROM is loaded in a CD-ROM drive 30 installed in a computer 31, the computer 31 produces a predetermined read-out command to a microcomputer 305 of the CD-ROM drive 30 (step S510).

Figure 1:
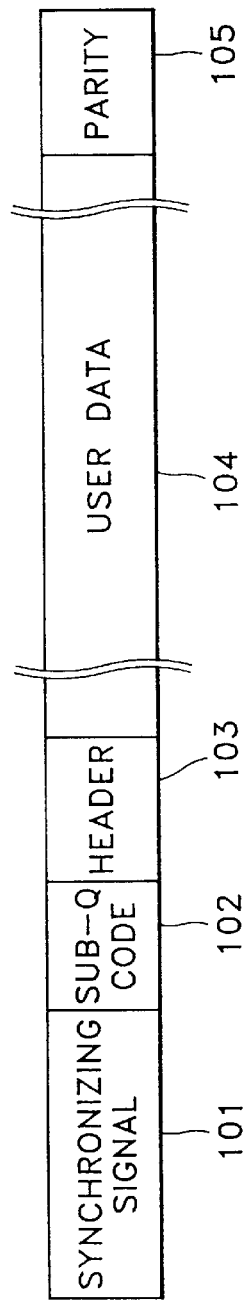
FIG. 1 shows the structure of a frame of a general CD-ROM.
Figure 2:
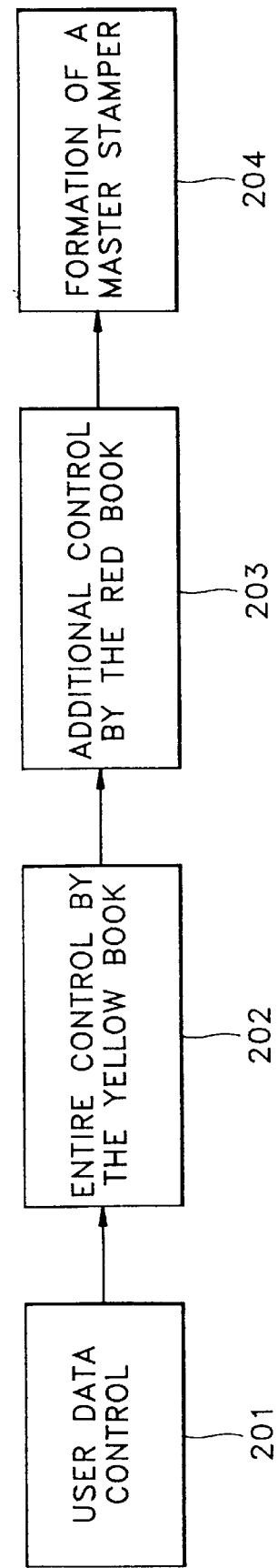
FIG. 2 is a flow diagram for describing the manufacturing process of a general CD-ROM.

Then, the microcomputer 305 of the CD-ROM drive 30 controls a digital signal processor (DSP) 303 and a servo signal processor (SSP) 306 to search for the sub-Q code area 102 shown in FIG. 1 of a first frame according to the input read-out command. The DSP 303 and the SSP 306 control a respective servo driver, which outputs a servo driving signal to drive a pickup and deck mechanism 301 to move a pickup to the sub-Q code area 102 of FIG. 1 (S520). The current signal from the pickup is input to the digital signal processor 303 as an EFM (eight to fourteen modulation) signal through an RF amplifier 302 which also provides the EFM signal to SSP 306. The digital signal processor 303 transmits the sub-Q code of the processed EFM signal to the microcomputer 305, which stores the input sub-Q code (step S525).

Next, the microcomputer 305 enables a decoder 304 (step S530) and reads the header, which is the primary output from the decoder 304 (step S535).

Then, the microcomputer 305 calculates the difference between the stored sub-Q code and the read header. That is, the microcomputer 305 computes the value of: sub-Q code—position of header (step S540). In other words, microcomputer 305 computes the value of the difference between the standard position information and the recording position information of a frame.

Then, in step S550, the microcomputer 305 determines if the difference is smaller than zero and respectively sets "1" (Step S552) in a FLAG byte if the difference is negative (−) and sets a "0" in the FLAG byte if the difference is positive (+) (step S551). Also, in step S553, if the absolute value of the difference is below a predetermined control value, e.g., below hexadecimal "75H", the microcomputer 305 sets the absolute value in a VALUE byte (step S555), and if the absolute value of the difference is greater than the predetermined control value, e.g., greater than hexadecimal "75H", the microcomputer 305 sets a hexadecimal "FFH" into the VALUE byte (step S554). The input FLAG byte and VALUE byte are transmitted to the computer 31 (step S556).

A predetermined inspection program is loaded in a RAM 313 of the computer 31. A central processing unit (CPU) 312 in computer 31 processes the FLAG and VALUE bytes which are input to the computer through a driver interface 311. The processed result data is displayed on a monitor 315 through a monitor interface 314. This provides a CD-ROM manufacturer an indication of the difference between the sub-Q code and a header, thereby facilitating the CD-ROM manufacturer in adjusting the recording structure of the master stamper.

As described above, according to the method for determining the difference between the sub-Q code and header of the CD-ROM, it is possible to determine the influence of the recording structure of the CD-ROM on the access time, thereby allowing steps to be taken to improve the quality and reliability of the CD-ROM.

Other modifications and variations to the invention will be apparent to those skilled in the art from the foregoing disclosure and teachings. Thus, while only certain embodiments of the invention have been specifically described herein, it will be apparent that numerous modifications may be made thereto without departing from the spirit and scope of the invention.

What is claimed is:

1. A method for determining a difference between a sub-Q code and a header of a CD-ROM loaded in a CD-ROM drive having a controller and a decoder, the method comprising:

providing a read-out command to the controller in the CD-ROM drive;

searching for a sub-Q code area of a first frame of the CD-ROM and reading a sub-Q code recorded in the sub-Q code area according to said read-out command and storing the sub-Q code;

enabling the decoder in the CD-ROM drive and reading header information of the CD-ROM which is output from said decoder; calculating a difference between the sub-Q code and the header based on the stored sub-Q code and read header information;

processing the difference to produce a result and outputting the result; and adjusting a recording structure of a master stamper according to the result output by said processing step, to thereby reduce the difference between the sub-Q code and the header.

2. The method for determining the difference between the sub-Q code and header of the CD-ROM as claimed in claim 1, wherein said searching for the sub-Q code area, enabling the decoder, calculating a difference between the sub-Q code and the header based on the stored sub-Q code and read header information, and processing the difference are performed by the controller.

3. The method for determining the difference between the sub-Q code and header of the CD-ROM as claimed in claim 1, wherein said header information is a primary output of the decoder.

4. The method for determining the difference between the sub-Q code and header of the CD-ROM as claimed in claim 1, wherein said result is output to a computer and displayed on a monitor of said computer.

5. The method for determining the difference between the sub-Q code and header of the CD-ROM as claimed in claim 1, wherein said CD-ROM drive comprises:

a pickup for detecting information recorded on the CD-ROM and outputting a current signal;

an RF amplifier for forming an EFM (eight to fourteen modulation) signal from the current signal output from said pickup and outputting the EFM signal;

a servo signal processor for performing servo control by processing said current signal and EFM signal according to the read-out command of said controller;

a digital signal processor for processing the EFM signal and detecting a data signal therefrom; and a servo driver for driving said pickup according to the servo control performed by said servo signal processor and digital signal processor.

6. The method for determining the difference between the sub-Q code and header of the CD-ROM as claimed in claim 5, wherein said searching for a sub-Q code area comprises:

controlling said digital signal processor and servo signal processor by the controller;

controlling said servo driver by said digital signal processor and servo signal processor;

driving and moving said pickup to the sub-Q code area of a first frame by said servo driver;

forming the EFM signal from the current signal output from said pickup by said RF amplifier;

processing said EFM signal and transmitting the sub-Q code to said controller by said digital signal processor; and storing the transmitted sub-Q code by said controller.

7. The method for determining the difference between the sub-Q code and header of the CD-ROM as claimed in claim 1, wherein said processing the difference to produce a result and outputting the result comprises:

setting a first predetermined value in a FLAG area when the calculated difference between the sub-Q code and header is negative and setting a second predetermined value in the FLAG area when the calculated difference is positive;

setting a VALUE area to an absolute value of the difference between the sub-Q code and header when the absolute value of the difference is below a predetermined control value and setting the VALUE area to a third predetermined value when the absolute value of the difference is greater than the predetermined control value; and inputting the values set in the FLAG and VALUE areas to a computer.

8. The method for determining the difference between the sub-Q code and header of the CD-ROM as claimed in claim 7, wherein said first predetermined value is "1", said second predetermined value is "0" and said third predetermined value is hexadecimal "FFH".

9. An apparatus for determining a difference between a sub-Q code and header of a CD-ROM loaded in a CD-ROM drive having a controller, comprising:

means for detecting information recorded on the CD-ROM and outputting a current signal;

means for forming an EFM (eight to fourteen modulation) signal from the current signal and outputting an EFM signal;

means for performing servo control based on said current signal and said EFM signal according to a control command of the controller;

means for processing the EFM signal and detecting a data signal therefrom;

means for controlling said means for detecting information recorded on the CD-ROM according to the servo control;

a controller receiving the data signal detected by a digital signal processor;

means for extracting header information from the EFM signal and outputting the header information to said controller;

means for displaying, wherein said controller determines and outputs difference information indicating a difference between the sub-Q code and the header based on the data signal detected by said means for detecting a data signal and the header information output from said means for extracting header information, and wherein said means for displaying displays the difference information.

10. A method comprising steps of:

reading a sub-Q code from a CD-ROM;

reading header information from the CD-ROM;

calculating a difference between the sub-Q code and the header; and adjusting, a recording structure of a master stamper according to the difference obtained in said calculating step, to thereby reduce the difference between the sub-Q code and the header.

11. The method of claim 10, wherein said adjusting step comprises a step of:

outputting to a computer and displaying on a monitor of said computer the difference obtained in said calculating step.

12. The method of claim 10, wherein said reading a sub-Q code step comprises steps of:

providing a read-out command to a controller of a CD-ROM drive; and searching for a sub-Q code area of a first frame of the CD-ROM and reading the sub-Q code recorded in the sub-Q code area according to said read-out command and storing the sub-Q code.

13. The method of claim 10, wherein said reading header information step comprises a step of:

enabling a decoder in a CD-ROM drive and reading header information of the CD-ROM which is output from said decoder.

14. A method comprising steps of:

reading a sub-Q code from a CD-ROM;

reading header information from the CD-ROM;

calculating a difference between the sub-Q code and the header; and displaying the difference calculated in a calculating step to allow a reducing structure of a master stamper to be adjusted to thereby reduce the difference between the sub-Q code and the header.

* * * * *